(12) United States Patent
Garrie

(10) Patent No.: US 8,321,205 B2
(45) Date of Patent: Nov. 27, 2012

(54) DEFINITIONAL METHOD TO INCREASE PRECISION AND CLARITY OF INFORMATION

(76) Inventor: Stuart Allen Garrie, Bellevue, WA (US)

( * ) Notice: Subject to any disclaimer, the term of this patent is extended or adjusted under 35 U.S.C. 154(b) by 0 days.

(21) Appl. No.: 13/418,541

(22) Filed: Mar. 13, 2012

(65) Prior Publication Data

US 2012/0173228 A1  Jul. 5, 2012

Related U.S. Application Data

(63) Continuation-in-part of application No. 12/006,552, filed on Jan. 2, 2008.

(51) Int. Cl.
*G06F 17/21* (2006.01)
*G06F 17/27* (2006.01)
(52) U.S. Cl. ............................... 704/10; 704/9
(58) Field of Classification Search ............ 704/10
See application file for complete search history.

(56) References Cited

U.S. PATENT DOCUMENTS

| | | | |
|---|---|---|---|
| 4,967,368 A * | 10/1990 | Bolling et al. | 706/52 |
| 7,136,876 B1 * | 11/2006 | Adar et al. | 1/1 |
| 7,254,530 B2 * | 8/2007 | Klavans et al. | 704/10 |
| 7,860,873 B2 | 12/2010 | Campbell | |
| 7,937,410 B2 * | 5/2011 | Steinmaier et al. | 707/802 |
| 2006/0161570 A1 * | 7/2006 | Venguerov | 707/101 |
| 2007/0192279 A1 * | 8/2007 | Van Luchene | 707/1 |
| 2007/0260591 A1 * | 11/2007 | Ahi et al. | 707/3 |
| 2010/0262620 A1 * | 10/2010 | Mohan | 707/776 |

OTHER PUBLICATIONS

Oxford English Dictionary Online, Oxford University Press, 2007, U.S.
Merriam-Webster Unabridged Dictionary CD, Ver. 2.5, Merriam-Webster Inc. 2000, U.S.
Brin, Sergey and Page, Lawrence, The Anatomy of a Large-Scale Hypertextual Web Search Engine, Computer Science Department, Stanford University, Stanford, CA 94305, Web site—http://infolab.stanford.edu/~backrub/google.html, 1998.
Garner, Bryan A., Black's Law Dictionary, 9th, WestLaw, 2009.
Stedman's Medical Dictionary, 28th, Lippincott Williams & Wilkins, 2006.

* cited by examiner

*Primary Examiner* — Richemond Dorvil
*Assistant Examiner* — Michael Ortiz Sanchez

(57) ABSTRACT

In order to know precisely and clearly what words mean, the DMTIPCI definitional method implements by use of a first algorithm steps for iteratively deconstructing all usage predicate words of all words in any language to their primary words, creating the DMTIPCI First Subject Word Dictionary. Primary words as herein defined are words that have no non-tautological words in their predicate(s). The second algorithm creates a list of all primary words and the third algorithm gives meanings to the primary words by citing examples of said primary words. All words are arranged under their primary words by a fourth algorithm creating a DMTIPCI Primary Word Dictionary. A fifth algorithm measures the accuracy of search engines.

3 Claims, 3 Drawing Sheets

DEFINITIONAL METHOD TO INCREASE PRECISION AND CLARITY OF INFORMATION

CROSS-REFERENCE TO RELATED APPLICATIONS

This application is a continuation of U.S. application Ser. No. 12/006,552, filed Jan. 2, 2008, which claims the benefit of U.S. Provisional Application No. 60/878,628, filed Jan. 4, 2007.

BACKGROUND OF THE INVENTION

1. Field of Invention

The DMTIPCI invention relates to the fields of Definitions and Classifications such as Dictionary building, 704/10; Data Processing, 707.

2. Background of the Invention

The following is a tabulation of some prior art references that presently appears relevant:

| Patent Number | Date | Name | Classification |
| --- | --- | --- | --- |
| 7,860,873 | Dec. 28, 2010 | Campbell, C. S. | 707 |

Non-Patent Literature Documents

Oxford English Dictionary Online, Oxford University Press, 2007, U.S. (OED).

Merriam-Webster Unabridged Dictionary CD, Ver. 2.5, Merriam-Webster Inc. 2000, U.S. (MWUD).

Brin, Sergey and Page, Lawrence, The Anatomy of a Large-Scale Hypertextual Web Search Engine, Computer Science Department, Stanford University, Stanford, Calif. 94305, Web site—http://infolab.stanford.edu/~backrub/google.html, 1998.

Garner, Bryan A., Black's Law Dictionary, 9th, WestLaw, 2009.

Stedman's Medical Dictionary, 28th, Lippincott Williams & Wilkins, 2006.

BACKGROUND OF THE INVENTION

Generally dictionaries are constructed by finding the usage predicates of words. Said usage predicates of words are recorded in said dictionaries when said predicates reach an arbitrary frequency of use. Examples of general dictionaries are the OED online (2007) and MWUD (2000) in non-patent literature or the CLU in U.S. Pat. No. 7,860,873 to Campbell (2010). Examples of specialized dictionaries are the Black's Law Dictionary (2009) and the Stedman's Medical Dictionary (2006) in non-patent literature or Campbell's subset terminology in U.S. Pat. No. 7,860,873 to Campbell (2010). Brin et al (1998) similarly based a search engine's search results partially on page-ranking (frequency of usage), see non-patent literature. After a speaker and hearer or writer and reader establish that they are using the same usage predicate for each word in a sentence, how can they know precisely and clearly what each said usage predicate's words mean? Similarly how does one know the accuracy of a search engine's results words?

BRIEF SUMMARY OF THE INVENTION

The problem of making sure both said speakers and hearers or said writers and readers give the same precise and clear meaning to each said usage predicate of said sentence's words is solved by finding said sentence's words and their said usage predicates in the novel and unique DMTIPCI dictionary. Said DMTIPCI dictionary is constructed by unique and novel algorithmic steps executed in a computer microprocessor. Said algorithmic steps iteratively deconstruct all usage predicates of all words or terms in any language to their root or primary words. Each said word or term with its iterative deconstruction and its primary words is then stored in a computer repository and/or in printed form by said algorithm implemented in a computer microprocessor. Said primary words are words or terms that cannot be defined by words or terms in a usage predicate(s); said primary words can only be defined clearly and precisely by examples as performed by DMTIPCI processes implemented by algorithmic steps in said computer microprocessor. Similarly the accuracy of a search engine's results can be found by using the DMTIPCI computer implemented processes of deconstructing the search and result words to their primary words and then comparing said search and result words' said primary words as to their degree of correlation.

DETAILED DESCRIPTION OF THE INVENTION

Figure 1:
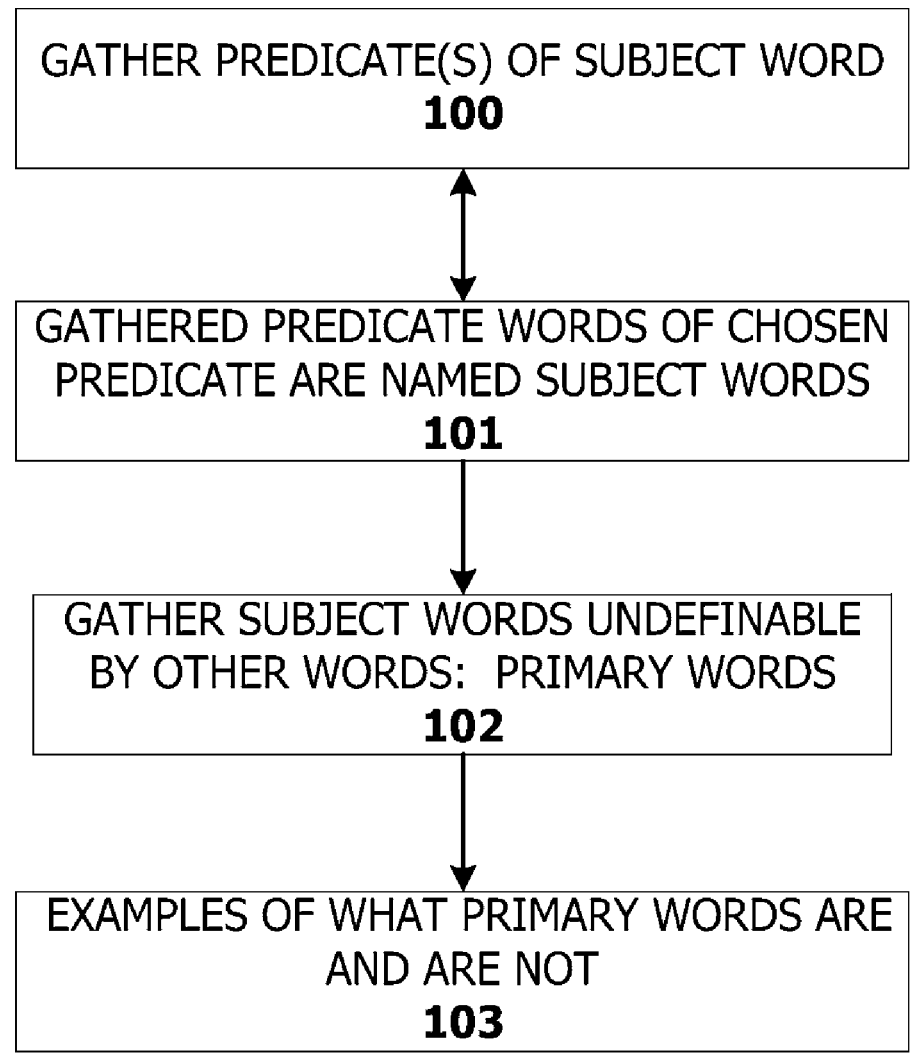
FIG. 1 illustrates the deconstructive steps of said iterative processes.

A portion of the disclosure of this patent document contains material which is subject to copyright protection. The copyright owner has no objection to the facsimile, reproduction by anyone of the patent document or the patent disclosure, as it appears in the Patent and Trademark Office patent file or records, but otherwise reserves all copyright rights whatsoever.

The first DMTIPCI computerized operation is a method of creating a dictionary by operating a computer microprocessor and a non-transitory computer storage repository having words with their usage predicates. Said method is implemented by the DMTIPCI first algorithm by executing the steps shown in FIG. 1: Using step 100, a word is gathered with its definitional usage predicate(s) from any language's computerized dictionary repository. Said word is the subject of the predicate definition(s) of said word, said word is named the first subject word. One of the predicates of said first subject word is chosen and named the first predicate of the first subject word. Using step 101, the predicate words of said first predicate are gathered and are named second subject words. Using step 100 the predicates of said named second subject words are gathered from said computerized dictionary repository. Using step 101, one of the gathered predicates of each of said named second subject words is selected based on being consistent with the context of said first predicate of said first subject word. The predicate words of said selected predicates of said second subject words are then named third subject words. Using step 100, the predicates of said named third subject words are gathered from said computerized dictionary repository. Using step 101, one of the predicates for each of said named third subject words is selected based on being consistent with the context of said first predicate of said first subject word. The predicate words of said selected predicates of said third subject words are then named fourth subject words. Said first computer algorithm implemented in said computer microprocessor consecutively executes steps 100 and 101 on each predicate of all said subject words from any language stored on any said non-transitory computer storage repository. This iterative loop going from step 100 to step 101 and back to step 100, ends with said named by number subject words being tautological words; that is, having predicate words that add no new meaning to said iteratively found final numbered subject words. No predicate word or phrase of words gives added meaning to these iteratively derived numbered subject words; they are said first subject word's primary words. Next said first algorithm implemented in said computer microprocessor stores alphabetically said first subject words with their iteratively derived predicates' deconstructions and their said primary words in said computer repositories and/or in printed form thus forming a novel and unique DMTIPCI First Subject Word Dictionary, Embodiment 1 of the DMTIPCI processes.

The second algorithm implemented in said computer microprocessor executes step 102 in FIG. 1, gathering all said primary words from said computer repository of said DMTICI First Subject Word Dictionary, thus creating a list of said primary words of all said subject words in any language and storing said list in said computer repositories and/or in printed form. DMTIPCI List of Primary Words is Embodiment 2 of DMTIPCI processes.

To understand the meaning of said primary words in said DMTIPCI List of Primary Words, the third DMTIPCI computer operation, named the third algorithm implemented in said computer microprocessor, is executed. Said third algorithm uses step 103, positive and negative examples of each said primary word in said primary word list are inputted under each said primary word in said primary word list and then stored as the Examples of Primary Words with each words' examples in said computer repositories and/or in printed form. By executing said third algorithm implemented in said computer microprocessor, any primary word can be displayed with the examples of what it is and what it is not on said computer's monitor or viewed in printed form—DMTIPCI Examples of Primary Words or Embodiment 3.

An illustration of the said operations of said DMTIPCI Embodiments 1, 2, and 3 implemented in said computer microprocessor follows: Said first algorithm implemented in said first computer microprocessor gathers from a computer's stored usage dictionary, MWUD (2000) in non-patent literature, one of the usage predicates of first subject word, "apple," step 100. One of the partial predicates of the subject word "apple" from MWUD (2000) is "the pome fruit of the genus *Malus* . . . ," which then is the partial said first predicate of said first subject word. The first algorithm using step 101 gathers said first predicate words of said first subject word "apple" and names said first predicate words named second subject words. In this illustration, one word in the chosen predicate of the definition for apple is "fruit," ($3^{rd}$ word—"the pome fruit . . . "). Then according to step 101, the predicate word "fruit," becomes one of said named second subject words, i.e. "fruit" (also "pome" would be one of said named second subject words). Returning to step 100, the first algorithm gathers the predicates for the word, "fruit," from said computer repository dictionary MWUD (2000). Then the first algorithm executes step 101 and gathers one of the predicates of the definition of "fruit." Said gathered predicates are always selected based on the fact that the predicates are consistent with the context of said first predicate of said first subject word, in this example, first subject word "apple." Said DMTIPCI computer algorithm would not select a usage predicate of the named second subject word "fruit" such as "the effect or consequence of an action or operation" from said MWUD (2000) as said named second subject word "fruit" would be used in the context of "the fruits of my labor" having no usage related to said first subject word "apple's" said partial first predicate. Proceeding, for named second subject word "fruit," one predicate consistent with the context of said first predicate of said first subject word, "apple," and therefore a selectable predicate is the following predicate from MWUD (2000): "a product of a plant growth useful to man or animal." Following step 101, the MWUD predicate for "fruit" includes the predicate word "product," ($2^{nd}$ word in predicate of named second subject word "fruit"), "product" then becomes one of said named third subject words. The first algorithm then executes step 100, gathering the said selectable predicates for said third subject word, "product." Following step 101, one of the gathered predicates of said third subject words, "product," from MWUD (2000) is "a substance produced from one or more other substances as a result of chemical changes." The first algorithm then implements step 101 on one of the words gathered in said predicate of named third subject word "product;" which is "produced" ($3^{nd}$ word in predicate of said third subject word "product"); "produce" then becomes a named fourth subject word. Looping back to step 100, one of the MWUD (2000) definitions of named fourth subject word "produce" is "to give being, form, or shape to: often raw materials." Implementing step 101, said first algorithm gathers said predicate's words "to give being;" "form;" "shape" and names them firth subject words. Implementing step 100, said first algorithm gathers one of definitional predicates of each named fifth subject words from MWUD (2000): Named fifth subject word, "Being," as a verb has the predicate "to exist." Named fifth subject word, "Form," as a verb has the predicate "to give shape to." Named fifth subject word, "Shape," as a verb has the predicate "to give a particular form to." The DMTIPCI computer implemented first algorithmic steps have come to a series of predicate words that have identical meaning to their subject words (said tautological words): The words "produce," "to give being," "form," and "shape" do not add new meaning to each other. At this point, steps 100 and 101 cannot be used to find non-tautological predicate words for the named fourth subject word "produce." In other words, none of the predicate words of the subject word add new meaning or understanding to the named fourth subject word "produce," therefore "produce" is a said primary word of the first subject word, "apple." This example is presented to illustrate the steps performed by the DMTIPCI first computer algorithm in said computer, FIG. 1. Implemented in said computer microprocessor, the DMTIPCI first algorithm would iteratively deconstruct to said primary words all the first predicate words of the first subject word "apple's" predicates and add the subject word "apple" with its iterative deconstruction and primary words to the DMTIPCI First Subject Word Dictionary which is stored in said computer repository and/or in printed form as Embodiment 1. Taking all the primary words of "apple" from said DMTIPCI First Subject Word Dictionary's said computer repository, said second algorithm implemented in said computer microprocessor following step 102 would place all the primary words of apple into the primary word list stored in said computer repository, Embodiment 2.

Using said first subject word "apple's" primary word "produce" as a concrete illustration of Embodiment 3, the said third algorithm implemented in said computer microprocessor would implement step 103 to input examples of the primary word, "produce," and list said examples under the primary word, "produce," in said computer repository. In order to understand the meaning of the primary word, "produce," said examples would need to be read or heard by being brought to the computer display and/or computer speaker by said third algorithm implemented in said computer microprocessor. The following are examples of said primary word, "produce:" Jim Dandy's factory produces very functional chairs. Does your patent produce or make anything? An example of a word meaning the opposite of "produce" would be the negative of produce, e.g. Jim Dandy's factory does not produce chairs. A patent application may not produce a patent.

What makes the DMTIPCI Examples of Primary Words, Embodiment 3, novel? Please note that said examples are not in the form that a usage dictionary would use to define the word "produce," see non-patent and patent literature. The example "Jim Dandy's factory produces very functional chairs." does not have the form of a subject word followed by a predicate such as "To produce is to xxxx xxxx something," with xxxx representing one of the predicate words defining the subject word. All primary words have tautological predicate words which add no meaning the primary word subject word. Said tautological predicate words mean the same as the primary subject word; for example, the tautological predicates for "produce" are "to bring into being" or "to make" or "to form." etc. Also primary words differ from other subject words in that their meanings does not change in differing usage areas or knowledge fields. An example would be the primary word, "one:" one book, one prosecution, one spine, one centimeter, one foot, etc. No specialized dictionary can be created because the word "one" means the same in all usages or contexts, e.g. by lawyers or carpenters.

The "apple" example of the DMTIPCI computer embodied processes illustrate a new method of making more precise and clarifying the understanding of information. FIG. 1 shows how DMTIPCI processes deconstruct said subject word's predicate terms or words to said primary words and how said primary words can be understood. Thus clarity and precision is given to the understanding of what a word means as one knows the precise meaning of each word in any said subject word's predicate. For example in a business group discussion wouldn't it be important that there is agreement among the participants as to what the words in the topic to be discussed precisely and clearly mean? By reading on a computer display the retrieved DMTIPCI dictionary's novel deconstruction of discussion topic words, the participants will all be assured that they are knowledgeable regarding what the topic words mean and thus be discussing the same topic.

Figure 2:
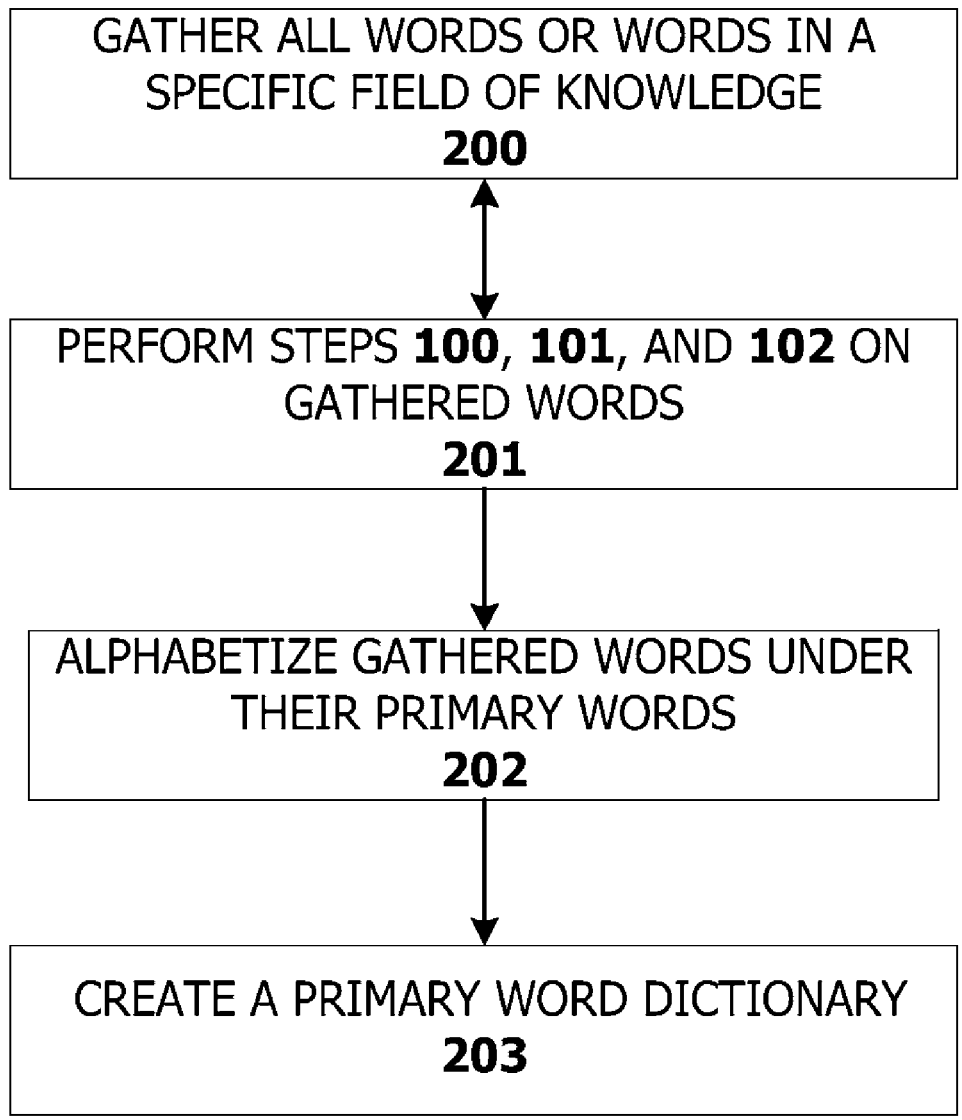
FIG. 2 illustrates the generation of a primary word dictionary.

The DMTIPCI following operational steps are incorporated into the fourth algorithm implemented by said computer microprocessor and are shown in the flow diagram of FIG. 2: All words or words in a specific field of knowledge are gathered from said computer storage repositories, step 200 and then said fourth algorithm implemented in a computer microprocessor executes step 201 on said gathered words which outputs said gathered words' primary word. The fourth algorithm implemented in a computer microprocessor then lists and alphabetizes said gathered words under said gathered words' respective primary words, step 202. This novel and unique classification of any language's words under their said primary words is then stored in computer repositories or in printed form—a unique and novel DMTIPCI Primary Word Dictionary, Embodiment 4. For example, the word "apple" is imputed into said computer having said fourth algorithm in its microprocessor, the algorithm would immediately implement the steps of FIG. 2, deconstructing the word "apple" to its said primary words, see flow chart FIG. 1. Then said fourth algorithm using step 202 in said computer microprocessor would list the word "apple" under its primary words. For example, one said primary word of first subject word, "apple," being "produce;" so "apple" would be listed under said primary word "produce" in said DMTIPCI Primary Word dictionary, step 203, said DMTIPCI Primary Word Dictionary, Embodiment 4 of the DMTIPCI processes.

An example of the use said DMTIPCI Primary Word dictionary follows: Said fourth computer algorithm implemented by said computer microprocessor can be used to find new words of customer interest by deconstructing to primary words the words of customer demographics and customer interest words in categories of customers, steps 200 and 201 in FIG. 2. Said fourth algorithm implemented in said computer microprocessor executes steps 200 and 201 on computer stored customer demographic data and customer interest words used by customers who buy shoes and finds said primary words of said customer demographic data words and said customer interest words. Then said fourth algorithm implemented in said computer microprocessor would retrieve words listed under said primary words of customer interest from said Primary Word Dictionary stored in said computer repository. The said fourth computer algorithm implemented by said computer microprocessor would then store said new found words of possible customer interest in said computer repository and/or in printed form.

Figure 3:
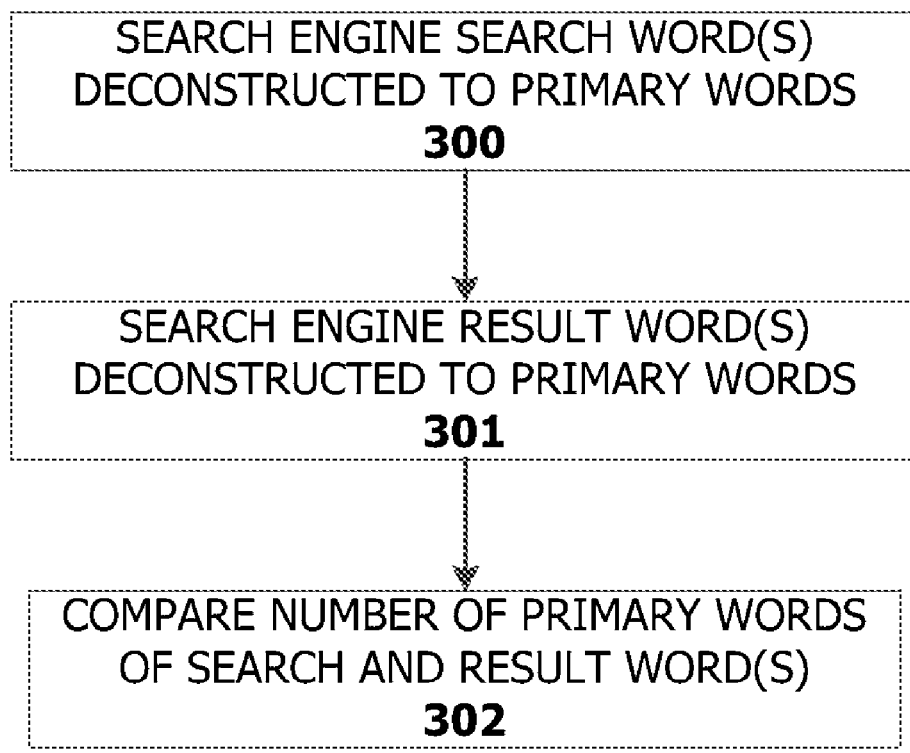
FIG. 3 illustrates measuring the accuracy of a search engine's results.

DMTIPCI processes can also be used to optimize the precision of search engine results and therefore used as a calibration tool for online search engines. FIG. 3 shows DMTIPCI operations of Embodiment 5 of DMTIPCI computerized processes. In step 300, the fifth algorithm implemented in said computer microprocessor chooses a particular "search word." That search word can be deconstructed by the fifth algorithm implemented by said computer microprocessor incorporating steps 100, 101, and 102 to find the search word's primary words, step 300. After step 300 is completed, the fifth algorithm implemented in a computer microprocessor executes step 301 on the search engine's result word(s) finding said result words' primary words. The fifth computer algorithm implemented in a computer microprocessor calculates the degree of positive correlation between the search word's primary words and the search results' primary words, step 302. By finding how many of the search word's primary words are present as primary words in the search engine results' words, step 302, the fifth algorithm implemented in said computer microprocessor, Embodiment 5, can be used calibrate the precision of search engine results.

The invention claimed is:

1. A method of creating a dictionary by operating a computer microprocessor and a non-transitory computer storage repository having words with their usage predicates comprising the steps of:
   A. gathering a word with all the usage predicates of said word by use of a first algorithm, implemented on said computer microprocessor, said gathered word is named the first subject word of said usage predicates;
   B. naming by use of said first algorithm one of said usage predicates of said first subject word the first predicate;
   C. gathering all the predicate words of said first predicate and naming them second subject words;

D. gathering the predicates of said second subject words from said computer storage repository;
E. selecting one of the predicates for each of the named second subject words that is consistent with the context of said first predicate of said first subject word;
F. naming all the predicate words of each second subject words' selected predicates, third subject words;
G. repeating the steps A-F iteratively for all predicate words of all said usage predicates of said first subject word until all said iteratively derived subject words are determined to be tautological words, which are subject words having predicate words that add no new meaning to said iteratively derived subject words;
H. designating said tautological words as primary words of said first subject word;
I. repeating said steps A-H iteratively for all words in any non-transitory computer storage repository containing words with their predicates;
J. creating a dictionary, named first subject word dictionary, consisting of said first subject words with their iteratively deconstructed usage predicates and their primary words;
K. storing said first subject words dictionary on said non-transitory computer storage repository and printing said first subject words dictionary;
L. creating a list of all said primary words by a second algorithm implemented by said computer microprocessor by copying said primary words from said computer storage repository of said first subject words dictionary;
M. storing said primary words list on said non-transitory computer storage repository and printing said list of all primary word;
N. understanding said primary words in first subject word dictionary by use of a third algorithm, implemented by said computer microprocessor, listing examples of said primary words under each of said primary words on said primary word list;
O. storing by use of said third algorithm said primary words list with said examples of each primary word in said non-transitory computer storage repository and printing said primary words list with said examples.

2. The method of claim 1, wherein said primary word list is gathered from said list of all said primary words by use of a fourth algorithm implemented in said computer microprocessor and;
   A. arranging, by use of said fourth algorithm implemented in said computer microprocessor, all said subject words alphabetically under their said primary words;
   B. storing, by use of said fourth algorithm implemented in said computer microprocessor, all said alphabetically arranged subject words under their said primary words in said non-transitory computer storage repository as a primary word dictionary and printed as said primary word dictionary.

3. The method of claim 1, wherein said iterative steps can be used by a fifth algorithm implemented in said computer microprocessor to determine one measure of the accuracy of a search performed by a search engine by;
   A. finding the primary words of one or more search words and the primary words of one or more result words of said search;
   B. comparing the number said primary words of said one or more search words to said primary words of said one or more search result words to find out how many of the primary words of said search and said result words are the same;
   C. measuring said accuracy of said search engine by percent of said same primary words between said search and result words.

* * * * *